Oct. 17, 1944.   E. BAERWALDE   2,360,387
DEVICE FOR CUTTING SCREW THREADS
Filed Sept. 29, 1941   3 Sheets-Sheet 1

INVENTOR.
Emil Baerwalde
BY Milburn & Milburn

Oct. 17, 1944.    E. BAERWALDE    2,360,387
DEVICE FOR CUTTING SCREW THREADS
Filed Sept. 29, 1941    3 Sheets-Sheet 2

INVENTOR.
Emil Baerwalde
BY Milburn & Milburn

Oct. 17, 1944.　　　　E. BAERWALDE　　　　2,360,387

DEVICE FOR CUTTING SCREW THREADS

Filed Sept. 29, 1941　　　3 Sheets-Sheet 3

INVENTOR.
*Emil Baerwalde*
BY *Milburn & Milburn*

Patented Oct. 17, 1944

2,360,387

UNITED STATES PATENT OFFICE 2,360,387

DEVICE FOR CUTTING SCREW THREADS

Emil Baerwalde, Cleveland, Ohio

Application September 29, 1941, Serial No. 412,890

2 Claims. (Cl. 90—11)

This invention relates to an improved form of attachment which can be applied to a conventional lathe and employed therewith for the purpose of cutting screw threads.

The primary object of this invention is to avoid the comparatively great cost of a regular screw-thread cutting machine, this saving being made possible by converting a conventional lathe into a thread-cutting machine at a comparatively small expense.

A further object is to devise an attachment that can be readily applied to a conventional lathe for this purpose and in a convenient, compact and efficient manner.

Another object is to devise such an attachment with means for conveniently adjusting the position of the thread cutter with respect to the stock in which the thread is to be cut, both as to elevation and vertical angle.

Another object is to provide such an attachment with means for indicating the vertical angle to which the rotatable thread-cutting shaft is adjusted with respect to the longitudinal axis of the stock in which the screw thread is to be cut.

Still another object is to devise a special form of cutter that can be readily attached to the laterally angularly disposed operating shaft of the attachment and that is so formed that the plane of the cutting action will be normal to the longitudinal axis of the stock to be formed with the thread.

A still further object is to design such a special form of cutter whose cutting edge portion will assume an angular relation to its axis of rotation, such angle corresponding to the angular arrangement of the rotatable shaft of the attachment laterally with respect to the longitudinal axis of the stock that is to be provided with the screw thread.

Another object is to devise such an attachment with different forms of cutters that can be readily and interchangeably applied to the operating shaft thereof for cutting the various types of screw threads that might be desired.

In carrying out these several general objects, I have devised a compact, convenient and efficient form of mechanism which constitutes another feature of my present form of invention and therefore another specific object.

Other objects will appear from the following description and claims when considered together with the accompanying drawings.

It is to be understood that the present form of disclosure is merely for the purpose of illustration and that there might be devised various modifications thereof without departing from the spirit of my invention as herein set forth and disclosed.

Figure 1:
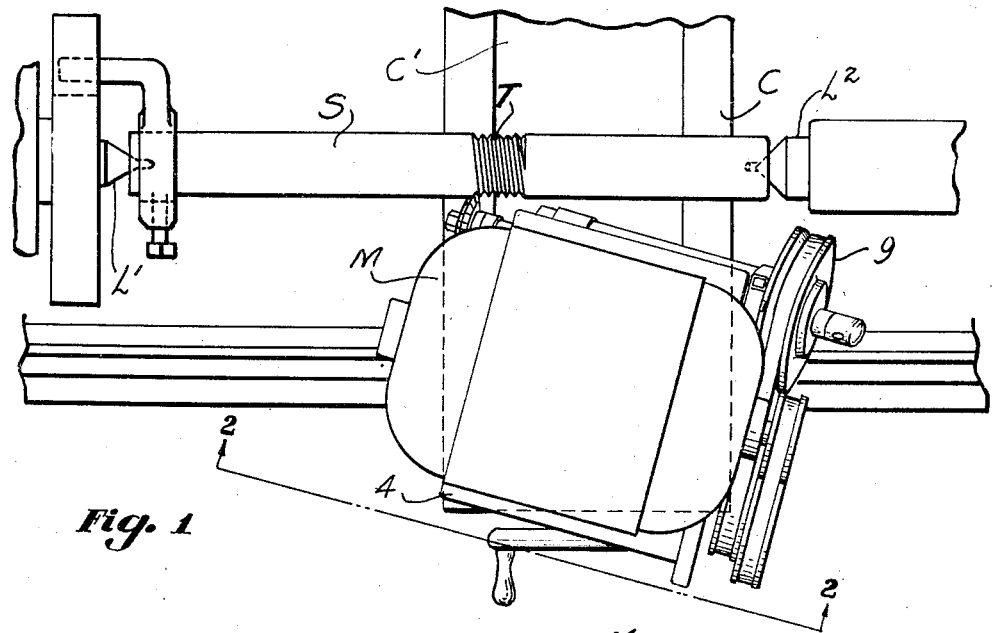
Fig. 1 is a top plan view illustrating the manner in which my present attachment is applied to a lathe which is indicated only in a general way.

Briefly, my attachment is intended to be secured in any suitable manner upon the cross-slide C' of the carriage C of a conventional form of lathe, as indicated in a general way in Fig. 1. As therein indicated, the attachment is so positioned that the rotatable axis of the cutting element thereof bears an angular relation laterally with respect to the longitudinal axis of the stock S which is rotatably mounted in the lathe so as to have the screw thread cut therein, the thread being indicated by reference letter T. As will more fully appear, the angular arrangement of the attachment with respect to the lathe is not limited to one particular angle but there is a definite relation and agreement between this angle and the particular design of the cutter. That is to say, the form of my particular cutter will correspond with the particular angle referred to in order to ensure that the cutting surface of the cutter will assume proper relation to the longitudinal axis of the stock S when in position to be cut with a thread. As already indicated, this involves a special form of cutter for each form of thread to be cut; and in each cutter, the plane of the cutting action bears an angle to the plane of the main body of the cutter, so as to ensure that the cutting surface of the cutter always assumes proper relationship to the axis of the stock S, as will be more fully explained.

In the particular form of attachment herein disclosed, bottom 1 of the bracket is adapted to be bolted at 2 in fixed position upon the cross-slide C' of carriage C of a conventional lathe so as to thereby support the entire attachment thereupon. After centering the axis of the cutting shaft with respect to that of the stock spindle of the lathe, this bracket will be set and secured at the desired angle laterally with respect to the lathe, as above explained, as indicated in Fig. 1 and as will be more fully understood from the following. This same bracket has the upright wall 3 which supports the operating mechanism of the attachment, while the top part 4 of this bracket supports the electric motor M for the operation of the attachment mechanism.

The shaft of the motor M has the pulley 5 which has belt connection 6 with the compound idler pulley 7 which in turn has belt connection 8 with the pulley 9 on hollow spindle 9A which is rotatably mounted in the shaft housing 10. As will be explained below, the housing 10 is capable of compound adjustment and the compound pulley 7 is slidably supported in the slot 11 in the arm 12 which is pivotally mounted at 13 upon the depending flange 4A of the bracket, while its forward end has adjustable means of engagement 14 in the arcuate slot 15 in the depending flange 4A. Thus, upon releasing the means of engagement 14, the arm 12 can be adjusted so as to always obtain the proper degree of tautness in the pulley belts and thereby compensate for the adjustment of the housing 10 of the cutter spindle.

Figure 5:
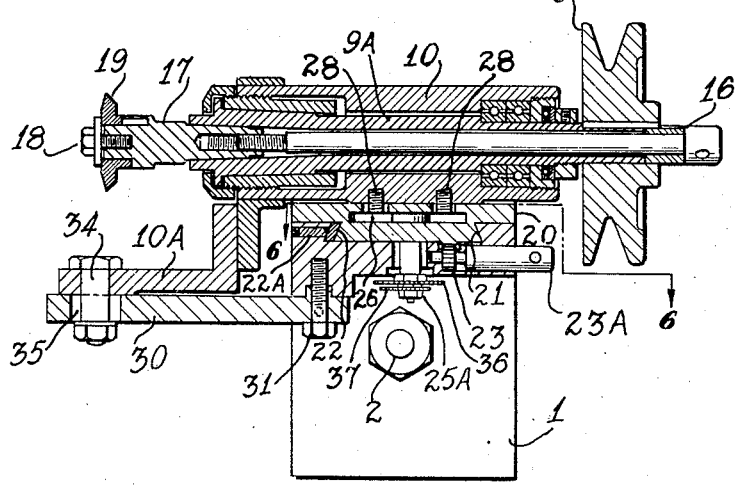
Fig. 5 is a view taken on line 5—5 of Fig. 2 and also of Fig. 3.

The cutter spindle comprises the member 16, which has spline connection with the pulley 9, and the member 17 which has tapered engagement within the other end of the hollow spindle 9A and has screw-threaded connection with the member 16 so as to be drawn into operative connection, as indicated in Fig. 5. The member 17 is adapted to receive any one of a set of cutters which can be interchangeably attached thereto by means of the screw and washer means 18. One of the cutters is illustrated in assembly at the point indicated by reference numeral 19.

The purpose of the adjustment of the housing 10 is to obtain the proper straight-line elevation of the cutter with respect to that of the stock S to be threaded and also to obtain the proper angular relation of the cutter vertically with respect to the axis of the stock S, according to the incline of screw thread desired in any given case. This compound adjustment is provided by means of the mechanism now to be described.

Upon the back of the upright wall 3 of the bracket there is mounted the plate 20 for vertical slidable adjustment, as indicated at 21, there being provided the gib 22 and screw pin 22A for releasably locking the plate 20 in adjusted position. Such vertical adjustment of the plate 20 is effected by means of the rack and pinion mechanism 23, this pinion being capable of manipulation by means of its outwardly projecting shaft 23A.

The housing or shaft bearing 10 is mounted upon the plate 20 for vertical straight-line adjustment therewith and for simultaneous pivotal adjustment about a horizontal axis corresponding with that of the hollow projection 24 which is provided upon the front of the slidable plate 20 and through which extends the pin 25 on the body of the housing 10 so as to have rotary bearing therein for pivotal adjustment of the housing 10. The body of the housing 10 has plain flat face engagement with the plate 20 so as to permit such pivotal adjustment.

Figures 4, 6:
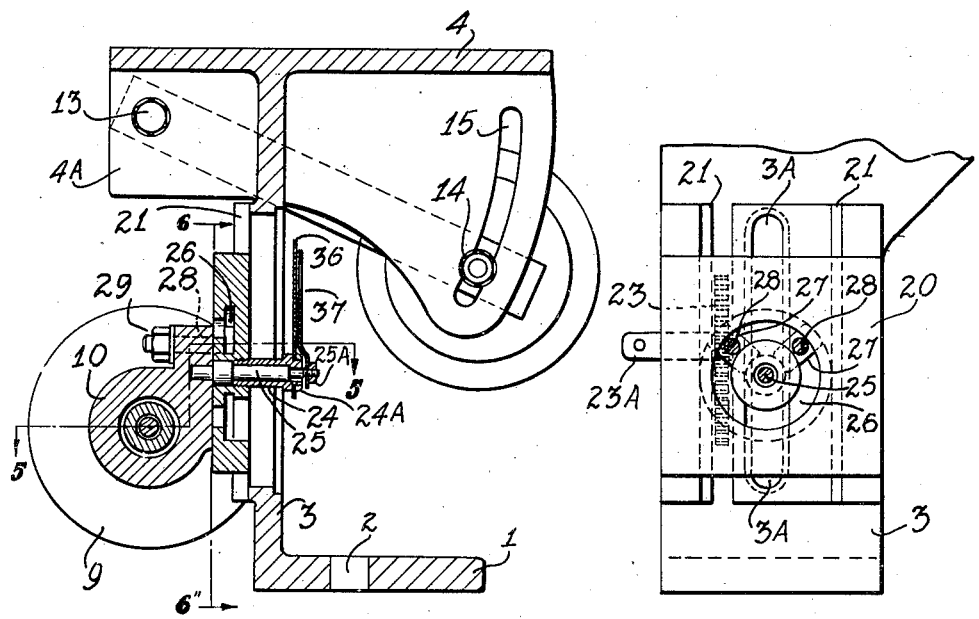
Fig. 4 is a view corresponding to line 4—4 of either Fig. 2 or Fig. 3.
Fig. 6 is a view corresponding to line 6—6 of Figs. 4 and 5.

Within the annular race 26, provided within the body of the plate 20 and concentrically of the axis of pivotal adjustment of the housing 10, there are floatingly arranged the pair of radially disposed flat members 27 whose inner and outer ends engage in the concentric grooves provided by the overhanging flanges. Each of the floating members 27 has affixed thereto a screw bolt 28 which extends rearwardly through the annular race-way 26 and through two holes in the body of the housing 10 which is releasably secured thereto by the nuts 29. The floating members 27 assume an angular relation to each other, when the parts are in assembly, since the points of securing the housing 10 thereto are located above the axis of pivotal adjustment thereof, as indicated in Figs. 4 and 6. The floating members 27 are individually adjustable about the axis of the hollow projection 24 and will have movement thereabout during adjustment of the cutter housing 10. Such adjustment may be effected when the nuts 29 and the gib-locking pin 22A are released; and the parts are then secured in the desired adjustment by these same locking means.

The stabilizer arm 30 is rigidly supported at the desired position upon and extends laterally from one side of the front part of the upright bracket 3 and affords compensating supporting connection for the outer end of the housing 10. Arm 30 is adjustable in the slide-way 33 and has the screw 31 and companion screw holes 32 for locking in position. If so desired, arm 30 may be provided with a vertically elongated hole 30A for bolt 31 and a pair of vertically adjustable set screws 30B for obtaining even finer adjustment of arm 30 than is afforded by the spacing of holes 32. Arm 30 may be originally set by first centering and securing the axis of the cutter spindle, with members 16 and 17 removed, between the centers of the head stock L' and tail stock L² of the lathe, this being done while the several fastening means of the attachment are loosened and preferably with the attachment elevated above the lathe carriage. Then the bottom part of the attachment is lowered and fastened down onto the cross-slide C' of the lathe carriage and, after releasing the cutter spindle from the lathe, the attachment is moved bodily with the cross-slide C' of the lathe carriage C to the proper extent forwardly from the center of the lathe spindle, and the bracket bottom 1 is adjusted to and fastened at the proper angle laterally upon the cross-slide C' of the carriage C. The index arm, mentioned below, is set at zero. Then the device is ready for use in the manner herein explained and without any further attention being required than that herein outlined and without having to repeat the adjustment just described.

Housing 10 has rigid arm 10A extending along the rear of arm 30 and has compensating connection with the outer end thereof by means of bolt 34 which extends through bolt hole in arm 10A and extends freely through elongated opening 35 in arm 30 so as to be capable of horizontal slidable adjustment.

Upright wall 3 of the bracket has a vertical slot 3A through which extend hollow projection 24 and pin 25 for up and down vertical adjustment.

Dial plate 36 is affixed to the forward end of hollow projection 24 by means of nut 24A; and index member 37 is affixed to the end of pin 25 by means of nut 25A so as to move therewith and thereby indicate the degree of angular adjustment of housing 10 and hence of shaft with respect to the stock.

Figures 2, 3:
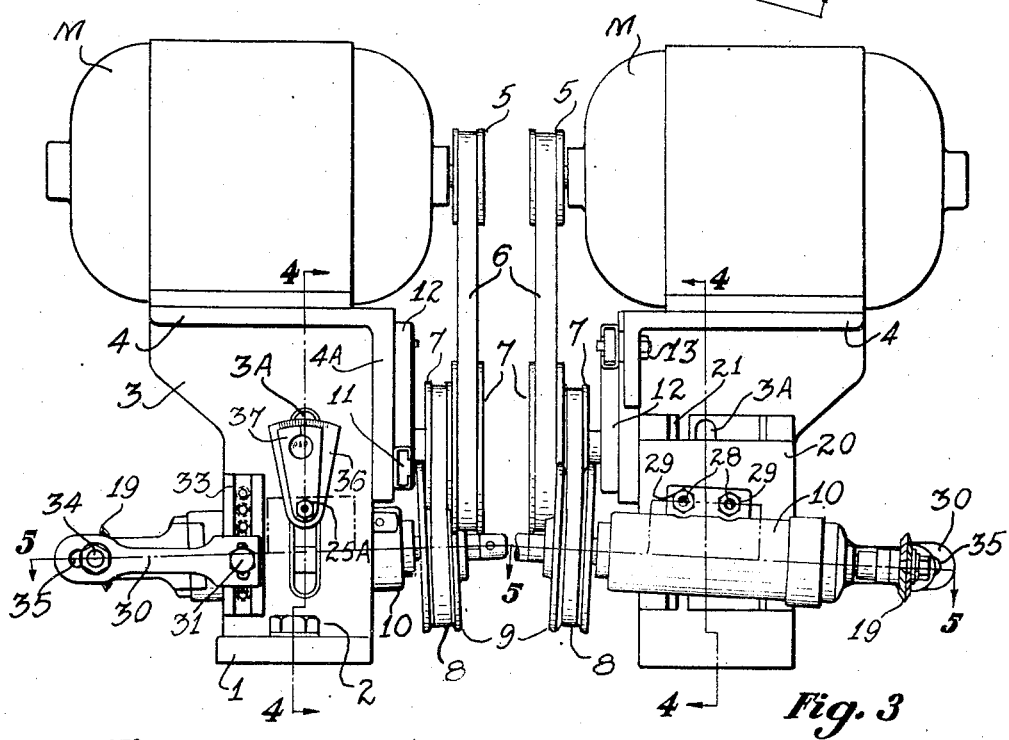
Fig. 2 is a view taken on line 2—2 of Fig. 1 and may be referred to as a front elevation of my present attachment.
Fig. 3 is a rear elevation of the attachment.
Figure 8:
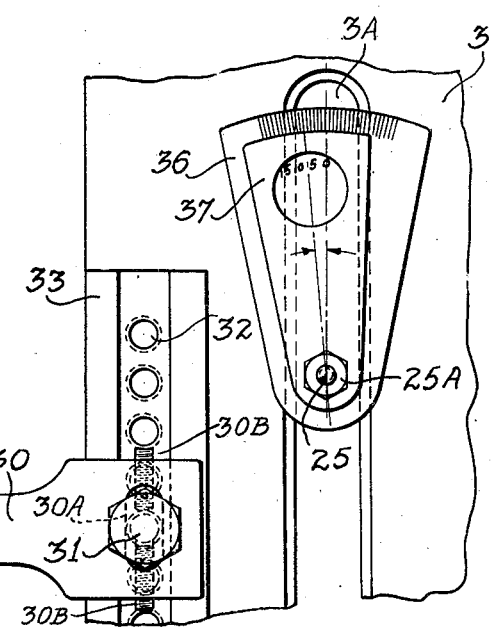
Fig. 8 is a front elevation of a portion of the attachment and illustrates especially the indicator means.

As indicated in Figs. 2 and 8, dial 36 is graduated and is marked with numerals to be viewed through an opening in the index 37 which is provided with a mark thereupon for reading the angle of movement of the member 37 and hence of the cutting shaft, thereby facilitating the setting of the cutter spindle at the desired angle vertically with respect to the axis of the stock S. It is to be understood that the index member 37 alone has rotatable movement as the cutter spindle is adjusted in the manner described.

Now to summarize, after the axis of the cutter spindle has been centered with respect to the lathe, as above explained, the attachment is securely set at the desired angle laterally with respect to the position of the stock S. The device is then ready for use without having to repeat such adjustment.

Then the angle of the cutter spindle vertically with respect to the axis of the stock S may be varied if, as and when desired, according to the incline of the screw thread contemplated in any given case. This is accomplished by loosening the nuts 29, the pin 22A and the bolt 34 so as to permit vertical straight-line adjustment of the plate 20 by means of the rack and pinion mechanism and also simultaneous pivotal adjustment of the cutter shaft about the axis of the fixed horizontal projection 24 as it is bodily adjusted vertically with the plate 20. The dial 36 will have straight-line movement vertically with the plate 20 while the index member 37 will have rotary movement about the axis of its support and over the dial 36 as the index member is carried in operative position therewith during the vertical adjusting movement. When the cutter spindle has been set at the desired angle vertically with respect to the axis of the different stock S to be threaded, the nuts 29, the pin 22A and the bolt 34 will all be tightened so as to secure the parts in such adjusted position. As will be understood, the indicating means will show the degrees of the angle of the screw threads on different stock.

The carriage C is advanced and the stock S is rotated by the regular operating means of the lathe while the motor M operates the cutter.

Figure 9:
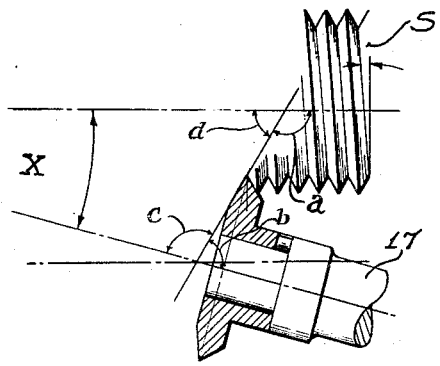
Figs. 9, 10 and 11 illustrate three different forms of cutters for three different types of screw threads and indicate the angular arrangement of the cutter axis and the cutting plane with respect to the longitudinal axis of the stock in which the thread is to be cut.
Figure 7:
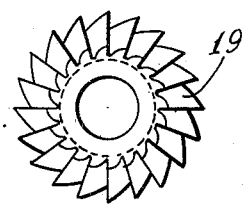
Fig. 7 is an elevation of one of my cutters.
Figure 10:
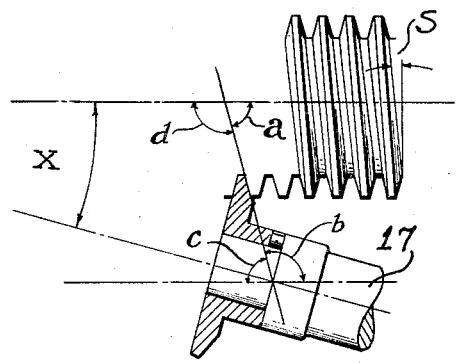
Figure 11:
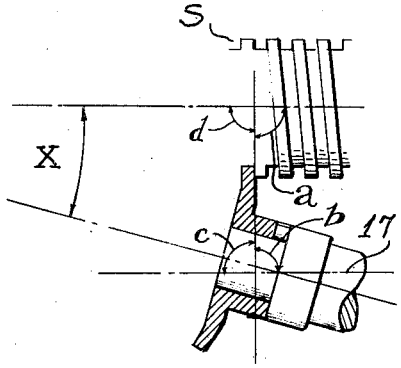

In all of the adjustments and operations above described, it is to be understood that any of the regular types of screw threads may be cut in the stock S, it merely being necessary to install the proper cutter upon the end of the spindle 17. For instance, Fig. 9 shows a cutter for a regular V thread; Fig. 10 shows a cutter for a regular "Acme" thread; and Fig. 11 shows a cutter for a regular "square" thread. In each of these several instances, it will be observed that the cutting surface of the cutter makes the angles $a$ and $d$ with the longitudinal axis of the work S and makes also the angles $b$ and $c$ with the longitudinal axis of the cutter shaft 17; and that the following relationship exists between these several angles and the angle X:

$$c = a - X$$
$$d = b - X$$

Thus it may be said that angles $c$ and $a$ differ by an amount equal to the angle X; and the same thing is true of angles $b$ and $d$, the cutting edge portion of each cutter itself being formed according to the angle X. Angle X is first chosen of sufficient degree to permit the cutter to clear the tail stock and then the cutter is especially formed in accordance therewith, the angle X remaining constant for this particular design of cutter. As above indicated, there will be designed a complete set of cutters for all the various forms of threads, that may be employed with the attachment set at the angle X.

Thus the present device is in the form of an attachment applied to a lathe in a particular manner, as above explained, for the purpose of clearing the tail stock and provided with a particular form or design of cutter, in each instance of thread to be cut, so as to compensate for the angular arrangement of the attachment upon the carriage and thus make it possible to cut standard threads in spite of the angular arrangement of the attachment for clearing the tail stock.

When in the following claims the rotatable shaft of the thread-cutting means is described as being arranged with the axis thereof extending at an angle in a generally horizontal plane rearwardly from the longitudinal axis of the stock, this manner of description is adopted for the purpose of distinguishing from the vertical plane and is not intended to preclude the possibility of angular adjustment of the rotatable cutting means vertically also.

In briefly summarizing the features of this device, it is to be noted that the housing 10 is given a compound adjustment, comprising straight-line and angular components of movement which are performed simultaneously and by means of a unitary manipulating means. By such adjustment, the vertical angle of the cutting shaft can be varied while maintaining the cutter itself always at the proper elevation with respect to the stock S.

Furthermore, such an attachment makes it possible to convert a conventional lathe into a thread-cutting machine with a very great saving in cost as compared with that of the regular thread-cutting machine, even taking into account the possibility of providing two such attachments so as to be able to cover the entire range of screw-threads that might be required at any time, including even those of heaviest duty, and, by virtue of the angular arrangement of the attachment, as indicated in Fig. 1, there is realized increased accessibility to the parts of the combined machine and hence greater convenience in its operation for this purpose.

The simplicity and convenience of operation of this device eliminates the necessity of expert operators and makes it possible for even women to run the machine after being once set up. This means a saving in cost of labor as compared with the regular thread-cutting machine.

It is to be understood that this attachment may be mounted directly upon the cross-slide or upon the compound rest or upon whatever means with which the lathe is equipped, and the following claims are to be so interpreted.

What I claim is:

1. In combination, a machine having rotatable head stock and tail stock for supporting the work, a carriage adapted for straight-line movement therealong, and an attachment fixedly mounted upon the carriage of the machine, said attachment including a rotatable shaft arranged with its longitudinal axis extending at an acute angle in a generally horizontal plane rearwardly from the longitudinal axis of the work and including also thread-cutting means operatively connected to the forward end of said rotatable shaft, the cutting surface of said thread-cutting means making angles with the longitudinal axes of the work and of the thread-cutter operating shaft, respectively, that differ by an amount equal to the angle between said axes, and means for co-ordinately rotating the work, advancing the carriage therealong and rotating the thread-cutting means, the angle between said axes being sufficient to permit the operating means for said thread-cutter to clear the tail stock of the machine during the cutting operation.

2. In combination, a machine including rotatable head stock and tail stock for supporting the work, a carriage adapted for straight-line movement therealong, and an attachment fixedly mounted upon the carriage of the machine, said attachment including a shaft for rotating a thread-cutter in operative relation to the work and being arranged with the longitudinal axis of said cutter-rotating shaft extending at an acute angle rearwardly from the work and in a generally horizontal plane, and a rotatable thread cutter in the form of a circular disk having its central body portion extending in a plane normal to the longitudinal axis of said cutter-rotating shaft and having its cutting surface making angles with the longitudinal axes of the work and of the cutter-rotating shaft, respectively, that differ by an amount equal to the angle between said axes, and operating means therefor, the angle between said axes being sufficient to permit the operating means for said thread-cutter to clear the tail stock of the machine during the cutting operation.

EMIL BAERWALDE.